(12) United States Patent
Strandborg et al.

(10) Patent No.: US 12,342,087 B2
(45) Date of Patent: Jun. 24, 2025

(54) MULTI-STAGE CHROMATIC ABERRATION CORRECTION

(71) Applicant: Varjo Technologies Oy, Helsinki (FI)

(72) Inventors: Mikko Strandborg, Helsinki (FI); Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 219 days.

(21) Appl. No.: 18/361,974

(22) Filed: Jul. 31, 2023

(65) Prior Publication Data

US 2025/0047993 A1    Feb. 6, 2025

(51) Int. Cl.
*H04N 25/611* (2023.01)
*H04L 67/131* (2022.01)
*H04N 9/73* (2023.01)

(52) U.S. Cl.
CPC .................. *H04N 25/611* (2023.01)

(58) Field of Classification Search
CPC ........ H04N 25/611; H04N 9/73; G06T 17/90; G06T 17/97; G06T 19/006; G06F 3/011; G06F 2111/18; H04L 67/131
See application file for complete search history.

(56) References Cited

U.S. PATENT DOCUMENTS

| | | | |
|---|---|---|---|
| 9,532,076 B2* | 12/2016 | Kobayashi | H04N 23/80 |
| 9,742,969 B2* | 8/2017 | Yakita | H04N 23/663 |
| 10,992,854 B2* | 4/2021 | Nashizawa | |
| 11,473,748 B1* | 10/2022 | Hong | F21S 41/192 |
| 2018/0157152 A1* | 6/2018 | Ajito | H04N 23/69 |

* cited by examiner

*Primary Examiner* — Marly S Camargo
(74) *Attorney, Agent, or Firm* — Ziegler IP Law Group, LLC.

(57) ABSTRACT

Calibration data pertaining to chromatic aberration in optics of client device(s) is obtained by server(s). First pose information indicative of at least a pose of the client device(s) over a first time period is received at server(s) from the client device(s). A first predicted pose of the client device(s) corresponding to a future time instant is estimated, at the server(s), based on first pose information. An image frame is reprojected from an initial pose to the first predicted pose, at the server(s), to generate a first reprojected image frame. A chromatic aberration correction is applied on the first reprojected image frame, at the server(s), based on the calibration data, to generate a first output image frame. The first output image frame is sent from the server(s) to client device(s).

8 Claims, 3 Drawing Sheets

MULTI-STAGE CHROMATIC ABERRATION CORRECTION

TECHNICAL FIELD

The present disclosure relates to systems incorporating multi-stage chromatic aberration corrections. The present disclosure also relates to methods incorporating multi-stage chromatic aberration corrections.

BACKGROUND

In recent times, there has been an ever-increasing demand for colour error-free image generation. Such a demand may, for example, be quite high and critical in case of evolving technologies such as immersive extended-reality (XR) technologies, which are being employed in various fields such as entertainment, real estate, training, medical imaging operations, simulators, navigation, and the like. Such immersive XR technologies create XR environments for presentation to users of XR devices (such as an XR headsets, pairs of XR glasses, or similar).

However, existing equipment and techniques for generating images have several problems associated therewith. Typically, the existing equipment and techniques involve utilizing optics which typically exhibit a behaviour known as chromatic aberration. Due to the chromatic aberration, wavelengths of different colour components of light emanating from a display of an XR device are incident upon a user's eye at different angles and at different positions on a retina of the user's eye, after traveling through said optics. This undesirably results in producing a colour fringing effect (i.e., a type of colour distortion) in an image frame (especially noticeable around features of an object represented in the image frame) when the image is displayed to the user of the XR device. Such a phenomenon is more pronounced towards a periphery of the optics (for example, such as lens). Some existing equipment and techniques employ chromatic aberration correction in order to mitigate effects due to the chromatic aberration. However, a conventional way of employing the chromatic aberration correction is highly computationally-intensive and time-consuming for an XR device. This is because multiple texture lookups per pixel are required to be performed when applying the chromatic aberration correction. Such lookups cause inefficient memory access patterns due to cache thrashing, and also requires reprojections (namely, time-warping) to be performed multiple times, which again need heavier processing. This adversely impacts image generation, and eventually leads to a non-immersive and unrealistic viewing experience for the user.

Therefore, in light of the foregoing discussion, there exists a need to overcome the aforementioned drawbacks.

SUMMARY

The present disclosure seeks to provide a system and a method for generating pose-consistent output image frames that are free from chromatic aberration, said output image frames being generated for at least one client device by at least one server, in a computationally-efficient and a time-efficient manner. The aim of the present disclosure is achieved by a system and a method which incorporate multi-stage chromatic aberration correction, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
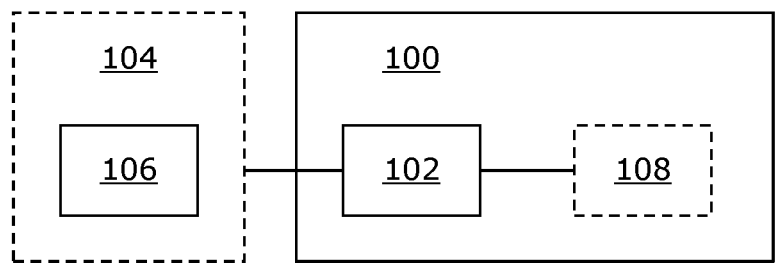
FIG. 1 illustrates a block diagram of an architecture of a system incorporating multi-stage chromatic aberration correction, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising at least one server that is communicably coupled to at least one client device, wherein the at least one server is configured to:
  obtain calibration data pertaining to chromatic aberration in optics of the at least one client device;
  receive, from the at least one client device, first pose information indicative of at least a pose of the at least one client device over a first time period;
  estimate a first predicted pose of the at least one client device corresponding to a future time instant, based on the first pose information;
  reproject an image frame from an initial pose to the first predicted pose, to generate a first reprojected image frame;
  apply a chromatic aberration correction on the first reprojected image frame, based on the calibration data, to generate a first output image frame; and
  send the first output image frame to the at least one client device.

In a second aspect, an embodiment of the present disclosure provides a method comprising:
  obtaining, by at least one server, calibration data pertaining to chromatic aberration in optics of at least one client device;
  receiving, at the at least one server from the at least one client device, first pose information indicative of at least a pose of the at least one client device over a first time period;

estimating, at the at least one server, a first predicted pose of the at least one client device corresponding to a future time instant, based on the first pose information;

reprojecting, at the at least one server, an image frame from an initial pose to the first predicted pose, to generate a first reprojected image frame;

applying, at the at least one server, a chromatic aberration correction on the first reprojected image frame, based on the calibration data, for generating a first output image frame; and sending the first output image frame from the at least one server to the at least one client device.

The first output image frame is generated at the at least one server in a manner that the first output image frame is free from any chromatic aberration and is also pose-consistent. This is because the calibration data enables the at least one server to correct the chromatic aberration inherent in the optics of the at least one client device, and the at least one server accurately and conveniently uses such calibration data to counteract (namely, compensate for) the chromatic aberration that would be perceivable to the user if the first reprojected image frame were displayed to the user without applying the chromatic aberration correction. Beneficially, this facilitates in providing the user with a high image quality (for example, in terms of a high resolution, accurate colour representation, a low noise, a high contrast, and the like) when the first output image frame is displayed at the at least one client device (with or without any further processing at the at least one client device). Moreover, the system and the method are susceptible for applying a majority of the chromatic aberration correction at the at least one server, which yields the first output image frame that appears colour distortion-free when viewed. This is made possible because the at least one server is configured to utilise the first pose information to estimate the first predicted pose of the at least one client device, and reproject the image frame (namely, an initial image frame) from the initial pose to the first predicted pose, prior to applying the chromatic aberration correction. As a result, the at least one client device does not need to perform any additional chromatic aberration, in a case when the first predicted pose is almost same as an actual pose at which the at least one client device needs to display the first output image frame (with or without any further processing). In another case when the first predicted pose is different from the actual pose, the at least one client device needs to perform a light-weight chromatic aberration correction at its end. This significantly reduces computational burden and excessive power consumption at the at least one client device. The system and the method are simple, robust, support real-time and reliable multi-stage chromatic aberration correction, and can be implemented with ease, in a computationally-efficient and a time-efficient manner.

In some implementations, the at least one server is implemented as a remote server. In an example, the remote server could be a cloud server that provides a cloud computing service, and could be arranged in a geographical location that is different from a geographical location of the at least one client device. In other implementations, the at least one server is implemented as a processor of a computing device that is communicably coupled to the at least one client device. Examples of the computing device include, but are not limited to, a laptop, a desktop, a tablet, a phablet, a personal digital assistant, a workstation, and a console. Optionally, the system further comprises the at least one client device.

The at least one client device could be implemented as a display device, or as another computing device serving the display device. Examples of the display device include, but are not limited to, a head-mounted display (HMD) device, and a smartphone. As an example, a smartphone can be inserted into a viewer made from cardboard, to display image frames to the user. The term "head-mounted display" device refers to a specialized equipment that is configured to present an extended-reality (XR) environment to a user when said HMD device, in operation, is worn by a user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to estimate the first predicted pose, based on the first pose information, and a second server from amongst the plurality of servers may be configured to apply the chromatic aberration correction on the first reprojected image frame to generate the first output image frame.

Throughout the present disclosure, the term "chromatic aberration" refers to an optical phenomenon that occurs when optics of a given device fails to focus different wavelengths of light incident thereupon at a same point. This undesirably results in producing a colour fringing effect (i.e., a type of colour distortion) when an image frame is displayed, especially around edges/corners of objects or their parts represented in the image frame. The chromatic aberration is typically caused due to dispersion of the light, wherein different wavelengths (corresponding to different colours) of the light having different refractive indices are focused (upon passing through the optics) at slightly different positions along an optical axis of said device. Thus, the different colours of the light appear at different optical depths in the form of colorful fringes around edges of the objects or their parts. The chromatic aberration could be a longitudinal chromatic aberration or a lateral chromatic aberration. The chromatic aberration is well-known in the art.

The optics of the at least one client device may comprise at least one of: a lens, a mirror, a prism, a beam splitter, a polariser, a collimator. It will be appreciated that the optics of the at least one client device is arranged in front of a display of the at least one client device in a manner that light emanating from pixels of the display passes through the optics, and then travels towards the user's eye when the at least one client device is in use by the user. Such an arrangement has been illustrated in conjunction with FIG. 2, for sake of better understanding and clarity. The display of the at least one client device will be discussed later in detail.

Throughout the present disclosure, the term "calibration data" pertaining to the chromatic aberration refers to information that is available for correcting the chromatic aberration inherent in the optics of the at least one client device. In other words, the calibration data serves as a basis for applying a chromatic aberration correction on an image frame, in order to generate a chromatic aberration-free image frame (namely, a colour distortion-free image frame).

The calibration data could be generic calibration data that is collected for correcting chromatic aberration inherent in optics of one or more client devices, and thus could be used for all other client devices having same or similar technical specifications (such as specific settings, characteristics, and parameters indicative of hardware and software capabilities of such client devices). Alternatively, the calibration data could be device-specific calibration data that is collected for correcting chromatic aberration inherent in optics of a specific client device only. It will be appreciated that the calibration data comprises information pertaining to properties or characteristics of the optics, for example, such as a focal length, an aperture, a colour distortion profile (such as a chromatic aberration profile), an optical distortion profile, information pertaining to colour channel shifts, and the like. Additionally, the calibration data may be represented using coefficients of a polynomial function, wherein different polynomial functions are utilized for different colour channels (for example, such as a red colour channel and a blue colour channel of a given image that is captured using the optics of the at least one client device). In this regard, coefficients of a polynomial function for a green colour channel may lie between coefficients of the polynomial function for the red colour channel and coefficients of the polynomial function for the blue colour channel. Alternatively, there could also be a separate polynomial function for each colour channel of the given image. The adoption of this polynomial function-based approach enables incorporation of all relevant information regarding depth information of pixels of the given image, including focal lengths and other pertinent characteristics. This may eliminate a necessity for performing expensive optical calculations on a per-pixel basis. By pre-computing the polynomial coefficients (as discussed above) based on the calibration data, the polynomial coefficients can be effectively applied during image processing, thereby ensuring an improved accuracy and efficiency in the optics.

It will also be appreciated that the calibration data could be collected during a calibration process. In this regard, the at least one client device may be typically calibrated according to the user's eyes (for example, according to his/her interpupillary distance), prior to using the at least one client device. Optionally, a processor of the at least one client device is configured to:
  control the display of the at least one client device to display at least one reference image frame;
  control at least one camera of the at least one client device to capture at least one image frame representative of an apparent view of the at least one reference image frame from a perspective of a given eye of the user; and
  analyse the at least one captured image frame and the at least one reference image frame to generate the calibration data.

Hereinabove, the term "reference image frame" refers to an image that is to be used for calibrating the at least one client device. The at least one reference image frame may present to the user one or more visual targets at one or more locations in said image frame. The term "visual target" refers to a visible mark (namely, spot) represented within the at least one reference image frame using a polychromatic light. A given visual target would be distinctly visible in the at least one reference image frame. For example, in the at least one reference image frame, a given visual target may be represented at a central portion, a corner portion, a top portion, a right-side portion, and the like, of a field of view of the user. Since the processor controls displaying of the at least one reference image frame, the one or more locations of the one or more visual targets are already accurately known to the processor.

Optionally, the at least one server is configured to obtain the calibration data directly from the at least client device. Alternatively, optionally, the at least one server is configured to obtain the calibration data from at least one data repository whereat the calibration data is pre-stored, the at least one data repository being communicably coupled to the at least one server. It will be appreciated that the at least one data repository could, for example, be implemented as a memory of the at least one server, a memory of the at least one client device, a memory of the computing device, a removable memory, a cloud-based database, or similar. Optionally, the system further comprises the at least one data repository.

Throughout the present disclosure, the term "pose" encompasses both a viewing position and a viewing direction of the at least one client device that is present in a real-world environment. It will be appreciated that the at least one server receives the first pose information from the at least one client device in real time or near-real time (i.e., without any latency/delay). It will also be appreciated that the pose of the at least one client device may not necessarily be same during an entirety of a given time period (as a user of the at least one client device moves in the real-world environment), and thus said pose may change at different time instants during the given time period. In such a case, given pose information would be indicative of different poses of the at least one client device corresponding to the different time instants during the given time period. In other words, the given pose information would be indicative of one or more poses of the at least one client device. Herein, the term "given pose information" encompasses at least the first pose information and the second pose information, and the term "given time period" encompasses at least the first time period and the second time period.

Optionally, the at least one client device comprises tracking means for tracking at least the pose of the at least one client device. In this regard, the given pose information is collected by the tracking means of the at least one client device. Apart from tracking the pose, the tracking means may also be employed to track a velocity and/or an acceleration with which the pose changes. In such a case, the given pose information may also be indicative of the velocity and/or the acceleration with which the pose changes.

It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible-light camera, an RFID reader. Optionally, the tracking means is implemented as a true six degrees-of-freedom (6DoF) tracking system. The tracking means may employ an outside-in tracking technique, an inside-out tracking technique, or a combination of both the aforesaid techniques, for collecting the given pose information that is indicative of at least the pose of the at least one client device. It will be appreciated that the given pose information may be collected by the tracking means continuously, periodically (for example, after every 10 milliseconds), or intermittently (for example, after 10 milliseconds, and then again after 50 milliseconds, and so on). For example, a rate of collecting the given pose information may be high, when a user of the at least one client device is moving in the real-world environment. In such a case, the given pose information may, for example, be collected at every millisecond. The given pose information may be in the form of images, IMU/TIMU values, motion sensor data values, magnetic field strength values, or similar.

Optionally, the given pose information is collected by the tracking means in a global coordinate space. Herein, the term "global coordinate space" refers to a 3D space of the real-world environment that is represented by a global coordinate system. The global coordinate system could, for example, such as a Cartesian coordinate system having a predefined origin and three mutually perpendicular coordinate axes namely, X, Y, and Z axes. A viewing position in the global coordinate system may be expressed as (x, y, z) position coordinates along the X, Y and Z axes, respectively. Optionally, the given pose information is further indicative of at least one of: a linear velocity, a linear acceleration, an angular velocity, an angular acceleration, with which the pose of the at least one client device changes over the given time period.

It will be appreciated that since the first pose information is indicative of the different poses of the at least one client device corresponding to the different time instants during the first time period, the at least one server can easily and accurately estimate the first predicted pose, for example, by interpolating or extrapolating from a trend with which the different poses of the at least one client device change. Optionally, in this regard, the at least one server is configured to process the given pose information using at least one data processing algorithm. Optionally, the at least one data processing algorithm comprises at least one of: a data interpolation algorithm, a data extrapolation algorithm, a feature detection algorithm. The aforesaid data processing algorithms are well-known in the art.

Throughout the present disclosure, the term "predicted pose" refers to an expected pose (i.e., a future pose) of the at least one client device at the future time instant. The term "future time instant" refers to a time instant at which an output image frame is expected to be displayed at the at least one client device. It will be appreciated that the future time instant could be different from an actual time instant at which the output image frame is actually displayed at the at least one client device. Moreover, the future time instant could be refined (namely, updated) at the at least one server as well as at the at least one client device.

Optionally, prior to reprojecting the image frame to generate the first reprojected image frame, the image frame is generated (by the at least one server) according to a viewing position and a viewing direction of the at least one client device as indicated by the initial pose. It will be appreciated that the initial pose may also have been predicted previously (by the at least one server), wherein the initial pose may have been predicted based on initial pose information received from the at least one client device. In some implementations, said image frame may be a visual representation of an extended-reality environment from a perspective of the initial pose of the at least one client device, wherein said visual representation is generated by the at least one server, for example, using a three-dimensional (3D) model of the extended-reality environment (as discussed hereinbelow).

Techniques for utilising the 3D model to generate a given image frame according to a given pose are well-known in the art. In other implementations, said image frame may represent at least one virtual object that is to be embedded on a video-see-through (VST) image captured by at least one camera of the at least one client device, for subsequently generating an MR image. In such a case, the at least one virtual object is generated according to the initial pose. In this regard, the at least one server is configured to employ at least a virtual object generation algorithm. The term "virtual object" refers to a computer-generated object (namely, a digital object). Examples of the at least one virtual object may include, but are not limited to, a virtual navigation tool (such as a virtual map), a virtual gadget, a virtual entity (such as a virtual person, a virtual animal, a virtual ghost, and the like), and a virtual vehicle or part thereof (such as a virtual car, a virtual cockpit, and so forth).

The term "visual representation" encompasses colour information represented in a given image frame, and additionally optionally other attributes associated with the given image frame (for example, such as depth information, luminance information, transparency information (namely, alpha values), polarisation information, and the like). Optionally, the colour information represented in the given image frame is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

The term "three-dimensional model" of the extended-reality environment refers to a data structure that comprises comprehensive information pertaining to objects or their parts present in the extended-reality environment. Such comprehensive information is indicative of at least one of: surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within the extended-reality environment. The term "object" refers to a physical object or a part of the physical object that is present in the extended-reality environment. An object could be a living object (for example, such as a human, a pet, a plant, and the like) or a non-living object (for example, such as a wall, a building, a shop, a road, a window, a toy, a poster, a lamp, and the like). Examples of the plurality of features include, but are not limited to, edges, corners, blobs, a high-frequency feature, a low-frequency feature, and ridges.

Optionally, the 3D model of the real-world environment is in a form of at least one of: a 3D polygonal mesh, a 3D point cloud, a 3D surface cloud, a 3D surflet cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. The aforesaid forms of the 3D model are well-known in the art.

Optionally, the at least one server is configured to obtain the 3D model from the at least one data repository. In such a case, the 3D model is pre-generated (for example, by the at least one server), and pre-stored at the at least one data repository. Alternatively, optionally, prior to using the 3D model, the at least one server is configured to generate the 3D model from a plurality of visible-light images and a plurality of depth images (corresponding to the plurality of visible-light images), based on corresponding poses from perspectives of which the plurality of visible-light images and the plurality of depth images are captured. Optionally, in this regard, the at least one server is configured to employ at least one data processing algorithm for processing the plurality of visible-light images and the plurality of depth images to generate the 3D model. Optionally, the at least one data processing algorithm is at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. Beneficially, the 3D model generated in this manner would be very accurate (for example, in terms of generating the first image using the 3D model), highly realistic, and information-rich. The 3D model could be generated prior to a given session of using the at least one client device. Optionally, the 3D model is generated in the global coordinate space.

It will be appreciated that the plurality of visible-light images, the plurality of depth images, and information pertaining to the corresponding poses could be received by the at least one server from any of:
 the at least one client device comprising the tracking means and at least one camera that is implemented as a combination of a visible-light camera and a depth camera, or
 the at least one data repository in which the plurality of colour images, the plurality of depth maps, and said information are pre-stored.

Notably, the at least one server is configured to generate the first reprojected image frame by reprojecting the image frame to match the perspective of the first predicted pose, according to a difference between the initial pose and the first predicted pose. Optionally, the first reprojected image frame is a visual representation of the extended-reality environment from a perspective of the first predicted pose, wherein said visual representation is generated by reprojecting the image frame in the aforesaid manner.

Optionally, when reprojecting the image frame from the initial pose to the first predicted pose, the at least one server is configured to employ a first reprojection algorithm. It will be appreciated that a given reprojection algorithm may perform any of: a three degrees-of-freedom (3DOF) reprojection, a six degrees-of-freedom (6DOF) reprojection, a nine degrees-of-freedom (9DOF) reprojection. The "3DOF reprojection" is an image reprojection that is performed by taking into account only differences between viewing directions of the at least one client device; and changes in viewing positions of the at least one client device are not considered. Such an approach is relatively fast and simple as it involves a straightforward texture lookup without any need for complex searching or marching algorithms. The "6DOF reprojection" is an image reprojection that is performed by taking into account both changes in the viewing directions and changes in the viewing positions of the at least one client device. In addition to this, the 6DOF reprojection utilises depth information (for example, in form of depth maps) of the real-world environment and ray marching/iterative image warping approaches, and requires multiple texture lookups per pixel. The "9DOF reprojection" is an image reprojection that is performed by taking into account changes in the viewing directions of the at least one client device, changes in the viewing positions of the at least one client device, and a motion of rendered content. Such an approach requires per-pixel motion vectors (namely, optical flow vectors of moving objects), motion estimator blocks from various video encoders, or similar. It is to be understood that the 6DOF reprojection and the 9DOF reprojection are relatively more accurate, but are slightly computationally intensive, as compared to the 3DOF reprojection. Reprojection algorithms and the three aforesaid reprojections are well-known in the art. The term "given reprojection algorithm" encompasses at least the first reprojection algorithm.

Notably, once the first reprojected image frame is generated, the chromatic aberration correction is applied on it, based on the calibration data. In this regard, since the calibration data comprises relevant information (pertaining to the properties or characteristics of the optics, as discussed earlier) for correcting the chromatic aberration, the at least one server can accurately and conveniently determine an amount of adjustment required to counteract (namely, compensate for) the chromatic aberration present in the first reprojected image frame. Said adjustment may involve modulating colour values (namely, increasing or decreasing one or more individual colour and/or luminance values) of each pixel in the first reprojected image frame accordingly, to generate the first output image frame. Beneficially, this facilitates in providing a high image quality (for example, in terms of a high resolution, accurate colour representation, a low noise, a high contrast, and the like) in the first output image frame. Techniques for applying the chromatic aberration correction are well-known in the art.

Optionally, each pixel of a display of the at least one client device comprises a plurality of colour components, and wherein, when applying the chromatic aberration correction, the at least one server is configured to:
 (i) calculate for a given pixel of the display, based on the calibration data, separate incoming direction vectors corresponding to respective ones of the plurality of colour components, wherein the incoming direction vectors represent different directions along which light of the respective ones of the plurality of colour components emanating from the given pixel travels after passing through the optics of the at least one client device;
 (ii) determine, based on the incoming direction vectors, separate pixel locations in the first output image frame corresponding to the respective ones of the plurality of colour components for the given pixel of the display;
 (iii) for each of the determined pixel locations in the first output image frame, fetch a value of a respective one of the plurality of colour components of the given pixel of the display from a corresponding pixel of the first reprojected image frame; and
 (iv) for each pixel location in the first output image frame, combine values of respective ones of the plurality of colour components fetched from the first reprojected image frame, thereby generating the first output image frame.

Herein, the term "display" refers to an element from which light emanates. The display of the at least one client device is driven to display image frame(s). Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. The display could also be implemented as a projector. Displays and projectors are well-known in the art. As an example, the plurality of colour components could comprise a red colour component, a green colour component and a blue colour component in case of RGB values. As another example, the plurality of colour components could comprise a cyan colour component, a magenta colour component, a yellow colour component and a black colour component in case of CMYK values.

It will be appreciated that since information pertaining to an extent of shifting of each of the plurality of colour components of the given pixel according to a chromatic aberration profile of the optics is known from the calibration data, the incoming direction vectors can be easily calculated by the at least one server, for example, by employing at least one of: a trigonometry-based formula, a vector geometry-based technique. A given incoming direction vector is indicative of a direction of light emanating from the display towards the user's eye, upon passing through the optics. Due to the chromatic aberration inherent in the optics, the incoming direction vectors represent the different directions in which the light of different colour components emanating from the given pixel is incident upon the user's eye at different angles and at different positions on a retina of the user's eye, when the at least one client device is in use by the user. It is to be understood that the aforementioned step (i) could be performed by the at least one server only once because pixels of the display are at fixed locations in the display.

Optionally, when determining the separate pixel locations, the at least one server is configured to calculate separate outgoing direction vectors corresponding to respective ones of the plurality of colour components, based on the incoming direction vectors. The outgoing direction vectors represent different directions for respective ones of the plurality of colour components from a same location at the retina of the user's eye (namely, a single starting point) towards separate pixel locations on the display (after passing through the optics of the at least one client device). Thus, based on the outgoing direction vectors, the separate pixel locations can be easily determined by the at least one server, for example, by mapping the outgoing direction vectors onto the first output image frame (that is generated at the at least one server, and is sent to the at least one client device). It will be appreciated that when the respective ones of the plurality of colour components would be shown at these separate pixel locations in the first output image frame, their light would travel according to the different outgoing direction vectors and would be incident upon a same location at the retina of the user's eye, thereby creating a sharp/accurate visual detail represented by the given pixel. It is to be understood that the aforementioned step (ii) could also be performed by the at least one server only once because the separate pixel locations would be same for all output image frames that are subsequently generated and are displayed on a same display.

Optionally, when fetching the value of the respective one of the plurality of colour components, the at least one server performs a lookup in a framebuffer of the first reprojected image frame in a pixel-by-pixel manner. Since the first reprojected image frame is generated by the at least one server itself, colour values of all pixels of the first reprojected image frame is readily accurately known to the at least one server.

In some implementations, a number of times a lookup is performed by the at least one server depends on a number of colour components of the given pixel. In an example, for RGB colour components of the given pixel, three separate lookups (one for each of three colour components) are performed. In such an example, for a pixel location in the first output image frame corresponding to the red colour component, out of the three colour components fetched for this pixel location, only a red colour value is selected, while a green colour value and a blue colour value are discarded. Likewise, for another pixel location in the first output image frame corresponding to the green colour component, out of the three colour components fetched for the another pixel location, only a green colour value is selected, while a red colour value and a blue colour value are discarded. Similarly, for yet another pixel location in the first output image frame corresponding to the blue colour component, out of the three colour components fetched for the yet another pixel location, only a blue colour value is selected, while a red colour value and a green colour value are discarded.

In other implementations, only one lookup (in which the plurality of colour components are fetched at once) may be performed by the at least one server, and a fetched value of the respective one of the plurality of colour components may be mapped to a respective pixel location in one go.

Optionally, at (iv), the values of the respective ones of the plurality of colour components at a given pixel location are combined to generate the given pixel (namely, a texel) of the first output image frame.

Throughout the present disclosure, the term "output image frame" refers to an image frame that is generated upon applying the chromatic aberration correction on a given reprojected image frame. It is to be understood that the first output image frame (that is generated at the at least one server) is sent to the at least one client device for further processing, as discussed hereinbelow.

Optionally, the at least one client device is configured to:
  receive the first output image frame from the at least one server;
  collect second pose information indicative of at least the pose of the at least one client device over a second time period that ends after the first time period;
  estimate a second predicted pose of the at least one client device corresponding to the future time instant, based on the second pose information;
  reproject the first output image frame from the first predicted pose to the second predicted pose, to generate a second reprojected image frame;
  apply an additional chromatic aberration correction on the second reprojected image frame, based on the calibration data, to generate a second output image frame; and
  display the second output image frame.

The second time period (during which the second pose information is collected by the tracking means) may or may not partially overlap with the first time period. However, since the second time period ends after the first time period, the second pose information is indicative of more recent/latest poses of the at least one client device, as compared to the first pose information. Therefore, it is likely that the second predicted pose is more accurate and precise than the first predicted pose. In other words, the second predicted pose may be understood to be a rectified version of the first predicted pose of the at least one client device. It is to be understood that the second time period ends after the first time period but still earlier than the future time instant. It will be appreciated that the at least one client device collects the second pose information in real time or near-real time. Estimation of the second predicted pose can be performed in a similar manner as discussed earlier with respect to the first predicted pose.

As discussed hereinabove, since the second predicted pose may be more accurate and up-to-date than the first predicted pose, the at least one client device is configured to generate the second reprojected image frame by reprojecting the first output image frame to match the perspective of the second predicted pose, according to a difference between the first predicted pose and the second predicted pose. Optionally, the second reprojected image frame is a visual representation of the extended-reality environment from a perspective of the second predicted pose of the at least one client device, wherein said visual representation is generated by reprojecting the first output image frame in the aforesaid manner. Optionally, when reprojecting the first output image frame from the first predicted pose to the second predicted pose, (the processor of) the at least one client device is configured to employ a second reprojection algorithm. Optionally, (the processor of) the at least one client device is configured to utilise a depth map corresponding to the first output image frame, when generating the second reprojected image frame by using the second reprojection algorithm.

In an embodiment, the second reprojection algorithm is different from the first reprojection algorithm. In this regard, the at least one server may be configured to employ the first reprojection algorithm to perform a computationally-intensive reprojection for generating the first output image frame (that is to be sent to the at least one client device). Beneficially, this potentially reduces a computational burden due to a subsequent reprojection at the at least one client device, thereby facilitating the at least one client device to employ the second reprojection algorithm for generating the second output image frame in a computationally-efficient and a time-efficient manner. Optionally, in such a case, the first reprojection algorithm performs any of: the 6DOF reprojection, the 9DOF reprojection, while the second reprojection algorithm performs the 3DOF reprojection. In another embodiment, the second reprojection algorithm is same as the first reprojection algorithm. As an example, the first reprojection algorithm and the second reprojection algorithm perform the 6DOF reprojection or the 9DOF reprojection.

Upon generating the second reprojected image frame, the additional chromatic aberration correction is optionally applied on it, based on the calibration data, in a similar manner as discussed earlier. The additional chromatic aberration correction could be applied only to fine-tune the chromatic aberration correction that was previously applied by the at least one server. This may be because the chromatic aberration correction (that was applied previously) may become slightly less effective due to a change in the pose of the at least one client device (namely, from the first predicted pose to the second predicted pose). It will be appreciated that a majority of the chromatic aberration correction is performed at a server side for generating the first output image frame. Due to this, no computationally-intensive processing is required for applying the additional chromatic aberration correction at a client side, for generating the second output image frame.

In cases where the at least one server has latest pose information of the at least one client device, a difference between the first predicted pose (estimated at the at least one server) and the second predicted pose (estimated at the at least one client device) is insignificant. As a result, the additional chromatic aberration correction need not necessarily be applied (by the at least one client device) on the second reprojected image frame, and thus this operation can be skipped. Beneficially, this may potentially facilitate in saving processing resources and processing time at the at least one client device.

Moreover, optionally, the at least one client device is configured to:

calculate a colour error for a given pixel or a given group of neighbouring pixels in the first output image frame, based on the calibration data, a location of the given pixel or the given group of neighbouring pixels in the first output image frame, and optionally, a difference between the first predicted pose and the second predicted pose;

determine a threshold error for the given pixel or the given group of neighbouring pixels, based on at least one of: a relative location of the given pixel or the given group of neighbouring pixels with respect to an optical centre of the first output image frame, a relative location of the given pixel or the given group of neighbouring pixels with respect to a gaze location on the first output image frame; and apply the additional chromatic aberration correction on the second reprojected image frame, only when the calculated colour error exceeds the threshold error.

Herein, the term "colour error" refers to a deviation or a difference between an intended (i.e., accurate) colour value for the given pixel or the given group of neighbouring pixels and an actual colour value for the given pixel or the given group of neighbouring pixels. It will be appreciated that information pertaining to an extent of dispersion of colour components of the given pixel according to the chromatic aberration profile of the optics of the at least one client device can be easily obtained from the calibration data. Greater the extent of dispersion of the colour components of the given pixel (as indicated by the calibration data), greater is the colour aberration for the given pixel or the given group of neighbouring pixels, and greater is the colour error for given pixel or the given group of neighbouring pixels, and vice versa.

Moreover, the calibration data would be different for different pixels or different groups of the neighbouring pixels (in other words, the calibration data would comprise pixel location-specific data), thus the location of the given pixel or the given group of neighbouring pixels would also be taken into account when calculating the colour error. It will be appreciated that said location is already accurately known to (the processor of) the at least one client device. In addition to this, optionally, greater the difference between the first predicted pose and the second predicted pose, greater is the colour error for given pixel, and vice versa. Therefore, (the processor of) the at least one client device can easily and conveniently calculate the colour error.

It will be appreciated that calculating the colour error for each group of neighbouring pixels (for example, groups of 2×2 pixels, 3×3 pixels, 2×3 pixels, or similar) is considerably faster (and is acceptably accurate), as compared to calculating the colour error in a pixel-by-pixel manner. Optionally, (the processor of) the at least one client device is configured to determine the colour error by employing at least one of: a CIELab-based colour difference formula, a CIEDE2000-based colour difference formula. The aforesaid colour difference formulae are well-known in the art.

Further, the term "threshold error" refers to an allowable colour error for the given pixel or the given group of neighbouring pixels below which the additional chromatic aberration correction need not be performed on the second reprojected image frame. In fixed-foveation implementations, the threshold error is determined based on the relative location of the given pixel or the given group of neighbouring pixels with respect to the optical centre. The fixed-foveation implementations are based on a fact that a user generally focuses at a central part of his/her field of view. When the user wishes to view object(s) in a periphery of his/her field of view, the user typically turns his/her head in a manner that said object(s) lie at the central part of his/her current field of view. In this regard, greater the distance of the given pixel or the given group of neighbouring pixels from the optical centre, lesser is the likelihood of the given pixel or the given group being prominently noticeable to the user's eyes. Therefore, the threshold error for a pixel or a group of neighbouring pixels located towards a peripheral part of the first output image frame would be greater, as compared to a threshold error of a pixel or a group of neighbouring pixels that is located towards a central part of the first output image frame. Moreover, it will be appreciated that the chromatic aberration is typically negligible near the optical centre due to optical properties of the optics; therefore, even when the user's gaze is focusing towards the optical centre, only minimal or no additional colour aberration correction is required to be performed by the at least one client device.

In active-foveation implementations, the threshold error is determined based on the relative location of the given pixel or the given group of neighbouring pixels with respect to the gaze location. The active-foveation implementations are based on a way in which the user actively focuses within his/her field of view. This means the gaze location on the first output image frame can be easily determined dynamically, based on a gaze direction of the user's eyes. The term "gaze location" refers to a location of a user's gaze in a visual scene represented in an image at which the user is looking or is going to look. In an example, the gaze location may correspond to a point in a top-right portion of the first output image frame. Notably, the user is not shown the first output image frame, but is instead shown the second output frame image. According to known properties of human visual system, a region of the first output image frame corresponding to the gaze location is resolved to a much greater degree of visual detail by (foveae of) the user's eyes, as compared to a remaining region of the first output image frame. Information pertaining to the gaze direction of the user's eyes can be obtained from gaze-tracking means of the at least one client device. Gaze-tracking means are well-known in the art. In the active-foveation implementations, greater the distance of the given pixel or the given group of neighbouring pixels from the gaze location, greater could be the threshold error for the given pixel or the given group, and vice versa. In other words, the threshold error for a pixel or a group of neighbouring pixels located towards or inside the gaze location would be lesser (as it would be perceived with high visual acuity), as compared to a pixel or a group of neighbouring pixels that is located away from the gaze location.

In this way, the additional chromatic aberration correction is selectively applied on the second reprojected image frame, depending on whether or not the calculated colour error exceeds the threshold error. As an example, for a fixed foveation case (as discussed earlier), the additional chromatic aberration correction may be applied for at least some pixels or groups of neighbouring pixels located towards or inside a central part of the second reprojected image frame. As another example, for an active foveation case (as discussed earlier), the additional chromatic aberration correction may be applied for at least some pixels or groups of neighbouring pixels located inside or towards a part of the second reprojected image frame that corresponds to the gaze location.

It will be appreciated that when the additional colour aberration correction is performed on the second reprojected image frame, the colour components of the given pixel would be more localized in the second output image frame as compared to an output image frame with no colour aberration correction. This localization means that the colour components are concentrated or grouped together in a smaller area. Such a localization can speed up image rendering due to better texture cache utilization. In computer graphics, GPUS (Graphics Processing Units) generally use texture caches to store texture data for efficient access. As the aforesaid reprojection (from the initial pose to the first predicted pose) and the colour aberration correction are performed to generate the first output image frame, the colour components are concentrated or grouped together in a smaller area as compared to the (initial) image frame. Thus, a proximity of the colour components allows for a more effective utilization of the texture cache, resulting into a faster rendering of output image frames. Generally, the texture cache, similar to CPU memory cache lines, store texture data in swizzled formats. Such a swizzling format arranges texels of a texture in a specific order within the CPU memory cache lines. When repeated texture accesses are made to nearby texture coordinates, the texture data for that area is likely to be already present in the texture cache. Notably, accessing the texture data from the texture cache is much faster than reading a new cache line from a VRAM (Video RAM). In a context of colour aberration correction, when an image contains significant colour aberrations, incoming direction vectors for the colour components diverge significantly. Such a divergence implies that accessing the texture data for each colour component would require fetching separate cache lines from the VRAM, which makes the entire process of performing the colour aberration correction slower. However, when a first pass of the colour aberration correction is performed at the at least one server, incoming direction vectors would be more uniform and these vectors would be incident upon approximately the same location at the retina of the user's eyes. This uniformity would lead to benefits from the texture cache, as nearby texture data for each colour component would likely be available in the texture cache, resulting in faster texture lookups and improved rendering performance at the client side.

Furthermore, optionally, the at least one server is configured to:
estimate the future time instant as a time instant at which the second output image frame is expected to be displayed at the at least one client device, based on at least one of: a time period elapsed between display of consecutive second output image frames at the at least one client device, a time at which a previous second output image frame was displayed at the at least one client device; and
refine the future time instant prior to estimating the first predicted pose, based on a change in the time at which the previous second output image frame was displayed.

Optionally, (the processor of) the at least one client device is configured to refine the future time instant prior to estimating the second predicted pose, based on at least one of: a time period elapsed between display of consecutive second output image frames at the at least one client device, an actual time at which a previous second output image frame was displayed at the at least one client device.

The present disclosure also relates to the method as described above. Various embodiments and variants disclosed above, with respect to the aforementioned system, apply mutatis mutandis to the method.

Optionally, the method further comprises:
receiving the first output image frame at the at least one client device from the at least one server;
collecting, at the at least one client device, second pose information indicative of at least the pose of the at least one client device over a second time period that ends after the first time period;
estimating, at the at least one client device, a second predicted pose of the at least one client device corresponding to the future time instant, based on the second pose information;
reprojecting, at the at least one client device, the first output image frame from the first predicted pose to the second predicted pose, for generating a second reprojected image frame;
applying, at the at least one client device, an additional chromatic aberration correction on the second reprojected image frame, based on the calibration data, for generating a second output image frame; and
displaying the second output image frame at the at least one client device.

Optionally, the method further comprises:
calculating, at the at least one client device, a colour error for a given pixel or a given group of neighbouring pixels in the first output image frame, based on the calibration data, a location of the given pixel or the given group of neighbouring pixels in the first output image frame, and optionally, a difference between the first predicted pose and the second predicted pose;
determining, at the at least one client device, a threshold error for the given pixel or the given group of neighbouring pixels, based on at least one of: a relative location of the given pixel or the given group of neighbouring pixels with respect to an optical centre of the first output image frame, a relative location of the given pixel or the given group of neighbouring pixels with respect to a gaze location on the first output image frame; and
applying, at the at least one client device, the additional chromatic aberration correction on the second reprojected image frame, only when the calculated colour error exceeds the threshold error.

Optionally, each pixel of a display of the at least one client device comprises a plurality of colour components, and wherein the step of applying the chromatic aberration correction comprises:
  (i) calculating, at the at least one server, for a given pixel of the display, based on the calibration data, separate incoming direction vectors corresponding to respective ones of the plurality of colour components, wherein the incoming direction vectors represent different directions along which light of the respective ones of the plurality of colour components emanating from the given pixel travels after passing through the optics of the at least one client device;
  (ii) determining, at the at least one server, based on the incoming direction vectors, separate pixel locations in the first output image frame corresponding to the respective ones of the plurality of colour components for the given pixel of the display;
  (iii) for each of the determined pixel locations in the first output image frame, fetching, at the at least one server, a value of a respective one of the plurality of colour components of the given pixel of the display from a corresponding pixel of the first reprojected image frame; and
  (iv) for each pixel location in the first output image frame, combining, at the at least one server, values of respective ones of the plurality of colour components fetched from the first reprojected image frame, thereby generating the first output image frame.

DETAILED DESCRIPTION OF THE DRAWINGS

Referring to FIG. 1, illustrated is a block diagram of an architecture of a system 100 incorporating multi-stage chromatic aberration correction, in accordance with an embodiment of the present disclosure. The system 100 comprises at least one server (depicted as a server 102) that is communicably coupled to at least one client device (depicted as a client device 104). Optionally, the client device 104 comprises pose-tracking means 106. Optionally, the system 100 further comprises is a data repository 108 that is communicably coupled to the server 102.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers, client devices, data repositories, and pose-tracking means. The person skilled in the art will recognize many variations, alternatives, and modifications of embodiments of the present disclosure.

Figure 2:
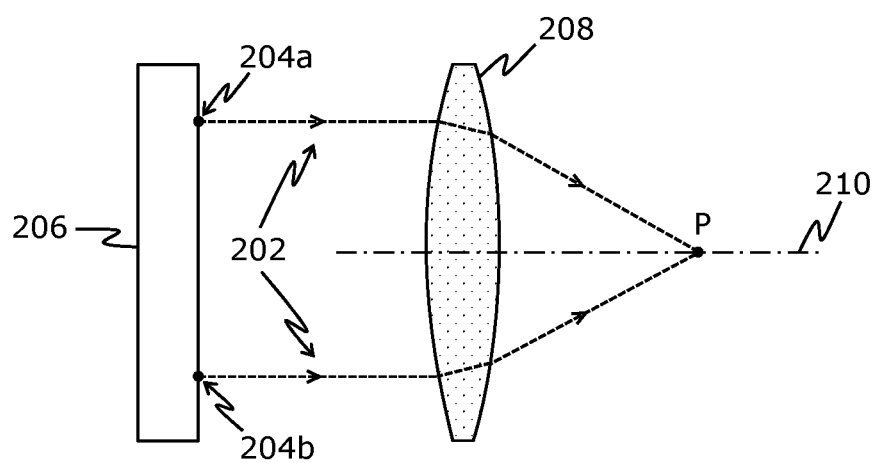
FIG. 2 illustrates an exemplary ray diagram depicting a path of light emanating from pixels of a display of a client device, in accordance with an embodiment of the present disclosure.

Referring to FIG. 2, illustrated is an exemplary ray diagram depicting a path 202 (depicted using dashed lines with arrows) of light emanating from pixels (depicted as pixels 204a and 204b, for sake of simplicity and clarity) of a display 206 of a client device, in accordance with an embodiment of the present disclosure. With reference to FIG. 2, the light follows the path 202 when chromatic aberration correction has been applied to a given (reprojected) image frame. The pixels 204a-b of the display 206 may comprise a plurality of colour components (for example, such as Red-Green-Blue (RGB) colour components and the like). The light emanating from the pixels 204a-b travels through optics 208 (for example, depicted as a convex lens, for sake of simplicity) of the client device and incidents upon a user's eye, for example, at a position 'P' on a retina of the user's eye, the position 'P' lies on a principal axis 210 (depicted using a dash-dot line) of the optics 208. Due to the chromatic aberration correction, the light of the respective ones of the plurality of colour components does not incident upon the user's eye at different angles and different positions.

Figure 3:
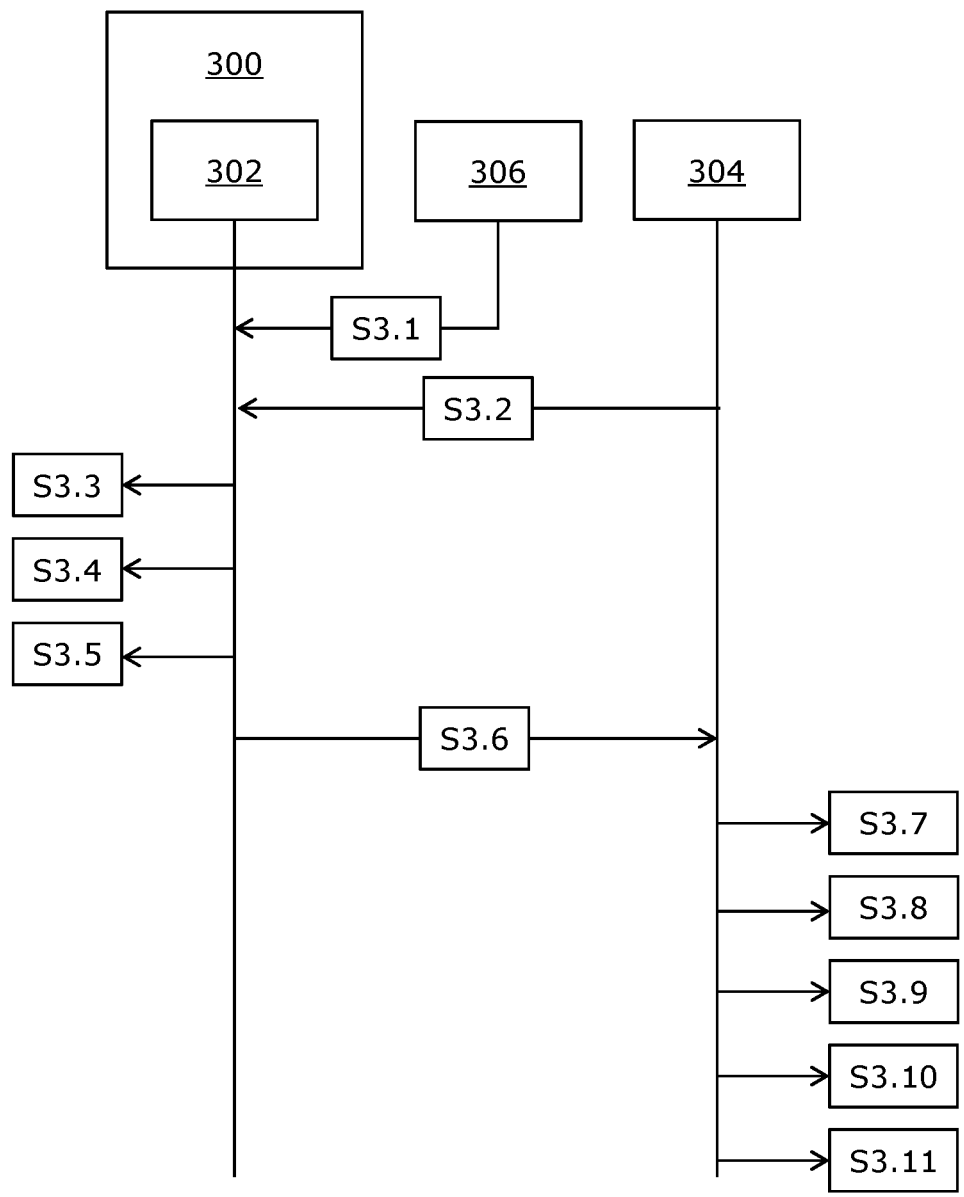
FIG. 3 illustrates a sequence diagram depicting operational steps of a system incorporating multi-stage chromatic aberration correction, in accordance with an embodiment of the present disclosure.

Referring to FIG. 3, illustrated is a sequence diagram depicting operational steps of a system 300 incorporating multi-stage chromatic aberration correction, in accordance with an embodiment of the present disclosure. The system 300 comprises at least one server (depicted as a server 302) that is communicably coupled to at least one client device (depicted as a client device 304). At step S3.1, calibration data pertaining to chromatic aberration in optics of the client device 304 is obtained at the server 302, for example, from a data repository 306 that is communicably coupled to the server 302. At step S3.2, first pose information is received at the server 302 from the client device 304, the first pose information being indicative of at least a pose of the client device 304 over a first time period. At step S3.3, a first predicted pose of the client device 304 corresponding to a future time instant is estimated, at the server 302, based on the first pose information. At step S3.4, an image frame is reprojected from an initial pose to the first predicted pose, at the server 302, to generate a first reprojected image frame. At step S3.5, a chromatic aberration correction is applied on the first reprojected image frame, at the server 302, based on the calibration data, to generate a first output image frame. At step S3.6, the first output image frame is sent from the server 302 to the client device 304. At step S3.7, second pose information is collected at the client device 304, the second pose information being indicative of at least the pose of the client device 304 over a second time period that ends after the first time period. At step S3.8, a second predicted pose of the client device 304 corresponding to the future time instant is estimated, at the client device 304, based on the second pose information. At step S3.9, the first output image frame is reprojected from the first predicted pose to the second predicted pose, at the client device 304, to generate a second reprojected image frame. At step S3.10, an additional chromatic aberration correction is applied on the second reprojected image frame, at the client device 304, based on the calibration data, to generate a second output image frame. At step S3.11, the second output image frame is displayed at the client device 304.

FIGS. 2 and 3 are merely examples, which should not unduly limit the scope of the claims herein. A person skilled in the art will recognize many variations, alternatives, and modifications of embodiments of the present disclosure.

Figure 4:
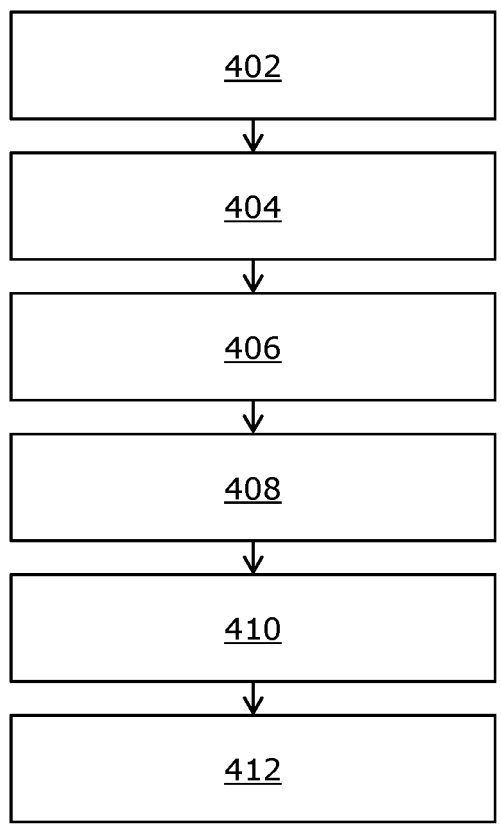
FIG. 4 illustrates steps of a method incorporating multi-stage chromatic aberration correction, in accordance with an embodiment of the present disclosure.

Referring to FIG. 4 illustrated are steps of a method incorporating multi-stage chromatic aberration correction, in accordance with an embodiment of the present disclosure. At step 402, calibration data pertaining to chromatic aberration in optics of at least one client device is obtained. At step 404, there is received, from the at least one client device, first pose information indicative of at least a pose of the at least one client device over a first time period. At step 406, a first predicted pose of the at least one client device corresponding to a future time instant is estimated, based on the first pose information. At step 408, an image frame is reprojected from an initial pose to the first predicted pose, to generate a first reprojected image frame. At step 410, a chromatic aberration correction is applied on the first reprojected image frame, based on the calibration data, for generating a first output image frame. At step 412, the first output image frame is sent to the at least one client device.

The aforementioned steps are only illustrative and other alternatives can also be provided where one or more steps are added, one or more steps are removed, or one or more steps are provided in a different sequence without departing from the scope of the claims.

What is claimed is:

1. A system comprising at least one server that is communicably coupled to at least one client device, wherein the at least one server is configured to:
   obtain calibration data pertaining to chromatic aberration in optics of the at least one client device;
   receive, from the at least one client device, first pose information indicative of at least a pose of the at least one client device over a first time period;
   estimate a first predicted pose of the at least one client device corresponding to a future time instant, based on the first pose information;
   reproject an image frame from an initial pose to the first predicted pose, to generate a first reprojected image frame;
   apply a chromatic aberration correction on the first reprojected image frame, based on the calibration data, to generate a first output image frame; and
   send the first output image frame to the at least one client device.

2. The system of claim 1, wherein the at least one client device is configured to:
   receive the first output image frame from the at least one server;
   collect second pose information indicative of at least the pose of the at least one client device over a second time period that ends after the first time period;
   estimate a second predicted pose of the at least one client device corresponding to the future time instant, based on the second pose information;
   reproject the first output image frame from the first predicted pose to the second predicted pose, to generate a second reprojected image frame;
   apply an additional chromatic aberration correction on the second reprojected image frame, based on the calibration data, to generate a second output image frame; and
   display the second output image frame.

3. The system of claim 2, wherein the at least one client device is configured to:
   calculate a colour error for a given pixel or a given group of neighbouring pixels in the first output image frame, based on the calibration data, a location of the given pixel or the given group of neighbouring pixels in the first output image frame, and optionally, a difference between the first predicted pose and the second predicted pose;
   determine a threshold error for the given pixel or the given group of neighbouring pixels, based on at least one of: a relative location of the given pixel or the given group of neighbouring pixels with respect to an optical centre of the first output image frame, a relative location of the given pixel or the given group of neighbouring pixels with respect to a gaze location on the first output image frame; and
   apply the additional chromatic aberration correction on the second reprojected image frame, only when the calculated colour error exceeds the threshold error.

4. The system of claim 1, wherein each pixel of a display of the at least one client device comprises a plurality of colour components, and wherein, when applying the chromatic aberration correction, the at least one server is configured to:
   (i) calculate for a given pixel of the display, based on the calibration data, separate incoming direction vectors corresponding to respective ones of the plurality of colour components, wherein the incoming direction vectors represent different directions along which light of the respective ones of the plurality of colour components emanating from the given pixel travels after passing through the optics of the at least one client device;
   (ii) determine, based on the incoming direction vectors, separate pixel locations in the first output image frame corresponding to the respective ones of the plurality of colour components for the given pixel of the display;
   (iii) for each of the determined pixel locations in the first output image frame, fetch a value of a respective one of the plurality of colour components of the given pixel of the display from a corresponding pixel of the first reprojected image frame; and
   (iv) for each pixel location in the first output image frame, combine values of respective ones of the plurality of colour components fetched from the first reprojected image frame, thereby generating the first output image frame.

5. A method comprising:
obtaining, by at least one server, calibration data pertaining to chromatic aberration in optics of at least one client device;
receiving, at the at least one server from the at least one client device, first pose information indicative of at least a pose of the at least one client device over a first time period;
estimating, at the at least one server, a first predicted pose of the at least one client device corresponding to a future time instant, based on the first pose information;
reprojecting, at the at least one server, an image frame from an initial pose to the first predicted pose, to generate a first reprojected image frame;
applying, at the at least one server, a chromatic aberration correction on the first reprojected image frame, based on the calibration data, for generating a first output image frame; and
sending the first output image frame from the at least one server to the at least one client device.

6. The method of claim 5, further comprising:
receiving the first output image frame at the at least one client device from the at least one server;
collecting, at the at least one client device, second pose information indicative of at least the pose of the at least one client device over a second time period that ends after the first time period;
estimating, at the at least one client device, a second predicted pose of the at least one client device corresponding to the future time instant, based on the second pose information;
reprojecting, at the at least one client device, the first output image frame from the first predicted pose to the second predicted pose, for generating a second reprojected image frame;
applying, at the at least one client device, an additional chromatic aberration correction on the second reprojected image frame, based on the calibration data, for generating a second output image frame; and
displaying the second output image frame at the at least one client device.

7. The method of claim 6, further comprising:
calculating, at the at least one client device, a colour error for a given pixel or a given group of neighbouring pixels in the first output image frame, based on the calibration data, a location of the given pixel or the given group of neighbouring pixels in the first output image frame, and optionally, a difference between the first predicted pose and the second predicted pose;
determining, at the at least one client device, a threshold error for the given pixel or the given group of neighbouring pixels, based on at least one of: a relative location of the given pixel or the given group of neighbouring pixels with respect to an optical centre of the first output image frame, a relative location of the given pixel or the given group of neighbouring pixels with respect to a gaze location on the first output image frame; and
applying, at the at least one client device, the additional chromatic aberration correction on the second reprojected image frame, only when the calculated colour error exceeds the threshold error.

8. The method of claim 5, wherein each pixel of a display of the at least one client device comprises a plurality of colour components, and wherein the step of applying the chromatic aberration correction comprises:
(i) calculating, at the at least one server, for a given pixel of the display, based on the calibration data, separate incoming direction vectors corresponding to respective ones of the plurality of colour components, wherein the incoming direction vectors represent different directions along which light of the respective ones of the plurality of colour components emanating from the given pixel travels after passing through the optics of the at least one client device;
(ii) determining, at the at least one server, based on the incoming direction vectors, separate pixel locations in the first output image frame corresponding to the respective ones of the plurality of colour components for the given pixel of the display;
(iii) for each of the determined pixel locations in the first output image frame, fetching, at the at least one server, a value of a respective one of the plurality of colour components of the given pixel of the display from a corresponding pixel of the first reprojected image frame; and
(iv) for each pixel location in the first output image frame, combining, at the at least one server, values of respective ones of the plurality of colour components fetched from the first reprojected image frame, thereby generating the first output image frame.

* * * * *